United States Patent [19]
Benzel

[11] Patent Number: 5,956,446
[45] Date of Patent: Sep. 21, 1999

[54] OPTICAL CABLE WITH A FLEXIBLE STACK OF OPTICAL FIBER RIBBONS

[75] Inventor: David Benzel, Calais, France

[73] Assignee: Alcatel, Paris, France

[21] Appl. No.: 08/958,583

[22] Filed: Oct. 28, 1997

[30] Foreign Application Priority Data

Oct. 28, 1996 [FR] France .................................. 96 13120

[51] Int. Cl.⁶ .................................................... G02B 6/44
[52] U.S. Cl. ........................... 385/114; 385/100; 385/115
[58] Field of Search .................... 385/100, 114, 385/115

[56] References Cited

U.S. PATENT DOCUMENTS

| | | | |
|---|---|---|---|
| 3,881,976 | 5/1975 | Jones | 385/114 X |
| 4,984,859 | 1/1991 | Fujigaki et al. | 385/114 X |
| 5,212,756 | 5/1993 | Eoll | 385/114 |
| 5,381,506 | 1/1995 | Amick et al. | 385/129 |
| 5,487,126 | 1/1996 | Oestreich et al. | 385/105 |

FOREIGN PATENT DOCUMENTS

| | | | |
|---|---|---|---|
| 0236800A2 | 9/1987 | European Pat. Off. | 385/114 X |
| 0295633A1 | 12/1988 | European Pat. Off. | 385/114 X |

*Primary Examiner*—Brian Healy
*Attorney, Agent, or Firm*—Sughrue, Mion, Zinn, Macpeak & Seas, PLLC

[57] ABSTRACT

The optical transmission cable comprises a sheath in which optical fiber ribbons are inserted, the optical fiber ribbons being disposed parallel on one another to form a stack of ribbons. Each ribbon is folded in two along a longitudinal midline. The stack of ribbons folded in two has an essentially V-shaped cross-section that is suitable for deforming elastically by varying the angle between the limbs of the V-shape, thereby enabling the cable to withstand being squashed without damaging the optical fibers.

4 Claims, 1 Drawing Sheet

OPTICAL CABLE WITH A FLEXIBLE STACK OF OPTICAL FIBER RIBBONS

The invention relates to optical transmission cables comprising a sheath within which fiber ribbons are inserted and are disposed on one another to form a stack of ribbons.

BACKGROUND OF THE INVENTION

Such cables must be capable of withstanding certain external stress forces exerted substantially radially relative to the longitudinal axis of the cable. These external stress forces lead to the cable sheath being squashed, thereby tending to compact the optical fiber ribbons and consequently to alter the optical transmission properties of the optical fibers, in particular by increasing the attenuation thereof, which is not desirable.

To increase the ability of optical transmission cables using ribbons to resist being squashed, proposals have already been made to house the optical fiber ribbons in a relatively rigid prefabricated structure having a plurality of slots, each ribbon being housed in a slot of the structure. However, that solution increases the manufacturing cost of cables. Also, the prefabricated structure tends to stiffen the cable, thereby giving rise to problems with cable laying.

In another known solution, provision is made for a cable sheath that is relatively rigid, and of relatively large diameter so as to leave sufficient empty space inside the sheath around the ribbons. As a result, if the sheath is deformed by being squashed, the ribbons can be pressed together in the space that remains free within the sheath. However that solution is not satisfactory since it goes against the need to reduce the section of optical transmission cables.

OBJECT AND SUMMARY OF THE INVENTION

The object of the invention is to propose an optical transmission cable having optical fiber ribbons, which cable is good at withstanding squashing, has low manufacturing cost, and is of small section.

To this end, the invention provides an optical transmission cable comprising a sheath and optical fiber ribbons disposed on one another to form a stack of ribbons inside said sheath, wherein each ribbon is folded in two along a longitudinal midline of the ribbon, and wherein the stack of ribbons that have been folded in two has a cross-section that is essentially V-shaped and that is suitable for deforming elastically by varying the angle between the branches of the V-shape under the effect of possible deformation of said sheath, the section of the sheath being small and suitable for housing said stack of ribbons folded in two, and the sheath being relatively flexible and deformable.

Thus, it is the elastic variation of this angle which makes it possible to provide the cable with good resistance to being squashed, and to do this without providing a rigid structure around the stack of ribbons.

BRIEF DESCRIPTION OF THE DRAWING

An embodiment of the cable of the invention is described below with reference to the drawing.

MORE DETAILED DESCRIPTION

Figure 1:
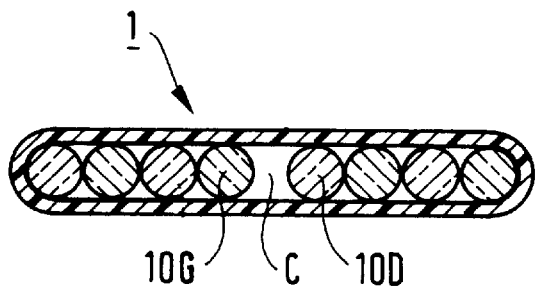
FIG. 1 is highly diagrammatic and shows an embodiment of an optical fiber ribbon adapted to making an optical cable of the invention.

FIG. 1 is a cross-section of an optical fiber ribbon 1 for an optical cable of the invention that withstands being squashed, with the ribbon being capable of folding in two in elastic manner about a fold line C that corresponds substantially to the longitudinal midplane of the ribbon. In the example of FIG. 1, this is made possible by leaving a gap of a certain size between the two optical fibers 10G and 10D situated on either side of the line C. Naturally, the degree of elasticity in bending is obtained in this case by appropriately selecting the insulating material within which the optical fibers are embedded in conventional manner.

Figure 2:
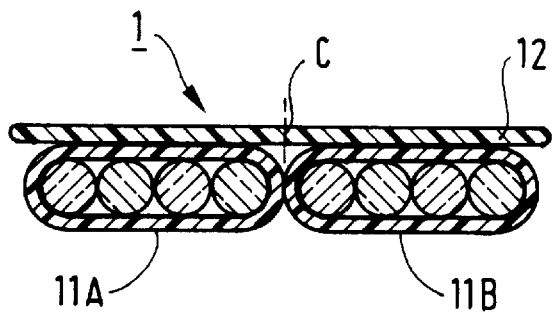
FIG. 2 is highly diagrammatic and shows another embodiment of an optical fiber ribbon adapted to making an optical cable of the invention.

FIG. 2 is another cross-section showing a ribbon 1 which is constituted in this case by a pair of smaller ribbons 11A and 11B that are juxtaposed on a flexible strip 12 of synthetic material or the like that is suitable for folding in elastic manner. In this figure, it can be seen that the small ribbons are spaced apart from each other to allow the strip 12 to fold along the line C which corresponds to the longitudinal middle of the strip.

In FIGS. 1 and 2, the ribbon configurations shown both have eight optical fibers each, however the invention extends to any analogous configuration with other numbers of fibers making up a ribbon.

Figure 3:
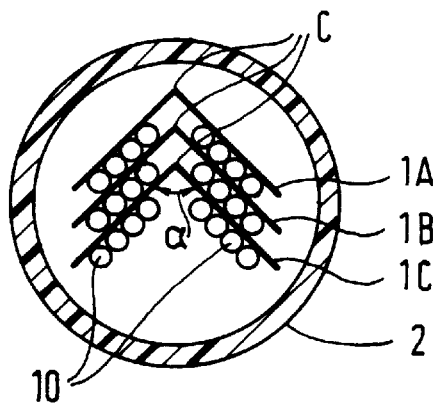
FIG. 3 is a highly diagrammatic section view of a stack of optical fiber ribbons folded in two inside a sheath of an optical cable of the invention.

In FIG. 3, a plurality of ribbons 1A, 1B, and 1C are disposed on one another inside an optical cable sheath 2 to form a stack of substantially V-shaped cross-section. If the ribbons are of the type shown in FIG. 2, it is preferable for the strip 12 of each ribbon to be disposed on the sheath side of the ribbon so as to obtain better protection for the optical fibers while the sheath 2 is being squashed. More particularly, it can be seen in this figure that the optical fibers 10 of the ribbon 1C are located on the inside of the limbs of the V-shape. Naturally the invention also extends to a configuration in which the optical fibers are located on the outsides of the limbs of the V-shape.

Figure 4:
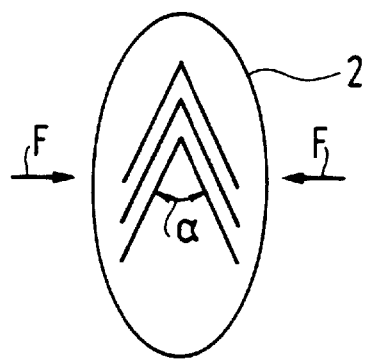
FIG. 4 shows how the cable of FIG. 3 deforms under the action of stress forces of a first type.
Figure 5:
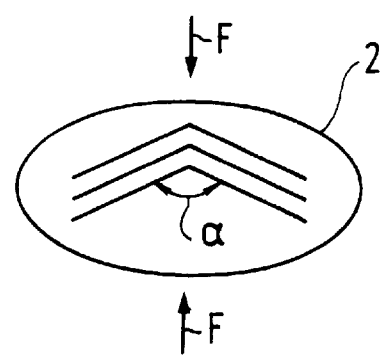
FIG. 5 shows how the cable of FIG. 3 deforms under the action of stress forces of a second type.

In FIGS. 4 and 5, when a stress force F is exerted on the sheath 2 (horizontal squashing in FIG. 4, vertical squashing in FIG. 5), the limbs of the V-shapes in the stack of ribbons move elastically towards each other or move elastically apart from each other. In this way, the elastic variation of the angle α between the limbs of the V-shapes makes it possible to prevent the optical fibers piling up in the event of the sheath being squashed. There is therefore no need to have an additional rigid structure to protect the optical fibers. Simultaneously, the sheath for housing the ribbons that are folded in two continues to have a small section.

I claim:

1. An optical transmission cable comprising a sheath and optical fiber ribbons disposed on one another to form a stack of ribbons inside said sheath, wherein each ribbon is folded in two along a longitudinal midline of the ribbon, wherein said sheath has an essentially circular cross-section, and wherein the stack of ribbons that have been folded in two has a cross-section that is essentially V-shaped with substantially straight uncurved branches defining an angle therebetween, and wherein the stack is not tightly fitted inside said sheath so that an outer surface of the stack does not continuously engage the inside surface of said sheath, whereby unintentional deformation of the sheath by radially directed forces respectively decrease and increase the angle between the branches of the V-shape, the section of the sheath being small and suitable for housing said stack of ribbons folded in two, and the sheath being relatively flexible and deformable.

2. An optical transmission cable comprising a sheath and optical fiber ribbons disposed on one another to form a stack of ribbons inside said sheath, wherein each ribbon is folded in two along a longitudinal midline of the ribbon, and wherein the stack of ribbons that have been folded in two has a cross-section that is essentially V-shaped and that is suitable for deforming elastically by varying the angle between the branches of the V-shape under the effect of possible deformation of said sheath, the section of the sheath being small and suitable for housing said stack of ribbons folded in two, and the sheath being relatively flexible and deformable, wherein each optical fiber ribbon comprises a pair of smaller ribbons juxtaposed but not touching on a flexible strip suitable for folding elastically along said longitudinal line between the two small ribbons on said strip.

3. A cable according to claim 2, in which the flexible strips of the ribbons are all disposed on the same side of said ribbons.

4. An optical transmission cable comprising a sheath and optical fiber ribbons disposed on one another to form a stack of ribbons inside said sheath, wherein each ribbon is folded in two along a longitudinal midline of the ribbon, and wherein the stack of ribbons that have been folded in two has a cross-section that is essentially V-shaped and that is suitable for deforming elastically by varying the angle between the branches of the V-shape under the effect of unintentional deformation of said sheath, the section of the sheath being small and suitable for housing said stack of ribbons folded in two, and the sheath being relatively flexible and deformable, wherein each optical fiber ribbon has a gap between the two optical fibers situated on either side of said midline.

* * * * *